(12) United States Patent
Adachi et al.

(10) Patent No.: US 6,393,697 B1
(45) Date of Patent: May 28, 2002

(54) METHOD OF MANUFACTURING CONNECTOR FOR FLAT CABLE

(75) Inventors: Hideki Adachi; Taro Imai, both of Shizuoka-ken (JP)

(73) Assignee: Yazaki Corporation, Tokyo (JP)

(*) Notice: Subject to any disclaimer, the term of this patent is extended or adjusted under 35 U.S.C. 154(b) by 0 days.

(21) Appl. No.: 09/293,770

(22) Filed: Apr. 19, 1999

(30) Foreign Application Priority Data

May 12, 1998 (JP) .............................. 10-128999

(51) Int. Cl.[7] .............................................. H01R 43/00
(52) U.S. Cl. .............................. 29/872; 29/863; 29/868
(58) Field of Search ........................... 29/825, 857, 861, 29/863, 872, 868

(56) References Cited

U.S. PATENT DOCUMENTS

| | | |
|---|---|---|
| 3,440,118 A | 4/1969 | Obeda |
| 4,369,910 A | 1/1983 | Hamano et al. |
| 4,589,584 A | 5/1986 | Christiansen |
| 5,429,517 A | 7/1995 | Bolen |
| 5,561,266 A | * 10/1996 | Okamoto et al. |
| 5,645,441 A | * 7/1997 | Okuhara et al. |
| 5,683,259 A | * 11/1997 | Sato |
| 5,762,507 A | * 6/1998 | Mochizuki et al. |
| 5,770,818 A | * 6/1998 | Tanaka et al. |
| 5,827,081 A | * 10/1998 | Sakamaki |

FOREIGN PATENT DOCUMENTS

| | | |
|---|---|---|
| DE | 19604797 A1 | 8/1996 |
| DE | 19804203 A1 | 8/1998 |

* cited by examiner

Primary Examiner—Carl J. Arbes
(74) Attorney, Agent, or Firm—Finnegan, Henderson, Farabow, Garrett & Dunner, L.L.P.

(57) ABSTRACT

A first cable conductor portion is placed on a first connector terminal. The first cable conductor portion is accommodated in a pressing recessed portion formed in an applying member. Ultrasonic vibration is applied to the first cable conductor portion and the first connector terminal and the first cable conductor portion and the first connector terminal are pressed, and thereby to be welded to each other.

8 Claims, 5 Drawing Sheets

METHOD OF MANUFACTURING CONNECTOR FOR FLAT CABLE

BACKGROUND OF THE INVENTION

1. Field of the Invention

The present invention relates to a method of manufacturing a connector for a flat cable which is applied to an electrical connection device which receives and transmits electrical signals between a rotary body connected to a steering wheel and a fixed body connected to a steering column in a steering mechanism of a vehicle, for example, a connector for a flat cable and an applying member for applying ultrasonic vibrations to be used for the method.

2. Description of Related Art

When a kind of an electrical connection device transmits signals from a flat cable wounded around a rotary body to an the outside by a connector, as a connection means between the flat cable and the connector there is used a connector for the flat cable which is connected to a tip portion of the flat cable.

Conventionally, a connector for a flat cable is composed as the following plural connector terminals are exposed on obverse surfaces and reverse surfaces and are insert molded in a first holder at a pitch equal to that between conductor portions of the flat cable plural bus bars are exposed on obverse surfaces and reverse surfaces and are insert molded in a second holder assembled to the first holder at a pitch equal to that between the conductor portions of the flat cable. The conductor portions of the flat cable are interposed between the plural connector terminals and the plural bus bars, and are collectively welded with the connector terminals and bus bars by ultrasonic welding, thereby being connected together.

In this case, the plural connector terminals are insert molded in the first holder so that are parallel to one another and are each separated therebetween by insulation walls which are integrally formed to the first holder.

In the ultrasonic welding, the conductor portions of the flat cable is set, and is positioned between the connector terminals and the bus bars. In this state, an anvil is putted under the connector terminals and an ultrasonic applying member which is to be inserted between the insulation walls is pressed on bus bars from upside. Ultrasonic energy is applied to them, and thus the connector terminals, the conductor portions of the flat cable and the bus bars are collectively welded by ultrasonic welding.

However, according to the conventional connector, a width of a contacting portion with a bus bar in the ultrasonic applying member is narrower than that of the bus bar, and if the ultrasonic applying member is off determined position relative to the bus bar, it cause connection strength to be degraded at the ultrasonic welding. Thus, a high work precision is required at the ultrasonic welding.

The connector terminals are insert molded in the first holder with neighboring insulation walls, the insulation walls ensure an insulating state of a circuit of each connector terminal. However, it is easy to appear a phenomenon that excessive resin of the insulation wall mounts on the connector terminal when forming the connector terminal, and the phenomenon causes connection strength to be degraded at the ultrasonic welding.

SUMMARY OF THE INVENTION

In view of the above, an object of the present invention is to provide a method of manufacturing a connector for a flat cable which has a high connection strength at a connection portion of a connector terminal and a flat cable without complicating a work at a ultrasonic welding, is obtained stablebly and thereby to improve a reliability, a connector for a flat cable, and an applying member for applying ultrasonic vibrations to be used for the same method.

From a first aspect of the present invention, there is provided a method of manufacturing a connector for a flat cable comprising the steps of: placing a first cable conductor portion on a first connector terminal; accommodating the first cable conductor portion in a pressing recessed portion formed to an applying member; and applying ultrasonic vibrations to and pressing the first cable conductor portion and the first connector terminal to be welded to each other.

Preferably, further comprising the steps of placing a second cable conductor portion on a second connector terminal spaced from the first connector terminal; accommodating the second cable conductor portion in a pressing recessed portion formed to an applying member; applying ultrasonic vibrations to and pressing the second cable conductor portion and the second connector terminal to be welded to each other; and inserting an insulation wall between the first connector terminal and the second connector terminal.

From a second aspect of the present invention, there is provided an applying member for applying ultrasonic vibrations used for manufacturing a connector for a flat cable. The applying member comprises a main body which has a pressing recessed portion which has a first side portion and a second side portion. The pressing recessed portion is deep to accommodate a cable conductor portion and has an opening wider than a connector terminal. The first side portion is to be interposed between a first connector terminal and a second connector terminal. The second side portion is to be interposed between the second connector terminal and a third connector terminal.

Preferably, the pressing recessed portion of the main body is deep to accommodate a bus bar to be placed on the cable conductor portion.

From a third aspect of the invention, there is provided a connector for a flat cable comprising: a first holder; a first connector terminal which is in the first holder and is welded to a first cable conductor portion by application of ultrasonic vibrations and pressing; a second connector terminal which is in the first holder, is spaced from the first connector terminal and is welded to a second cable conductor portion by application of ultrasonic vibrations and pressing; and a casing which is fixed to the first holder and has an insulation wall inserted between the first connector terminal and the second connector terminal.

Preferably, further comprising a second holder which is fixed to the first holder, and a bus bar which is in the second holder and is welded to the first cable conductor portion by application of ultrasonic vibrations and pressing.

In above-mentioned invention, the applying member for applying ultrasonic vibrations accommodates and arranges the bus bar and the cable conductor portion, and is placed at a proper welding position easily. Further, a connector terminal, the cable conductor portion and the bus bar are collectively welded to each other within a width of the connector terminal by application of ultrasonic vibrations and pressing.

Though the main body of the applying member has a pressing recessed portion wider than the connector terminal, the connector terminal has a neighboring space and is insert molded. Thus, there is no insulation wall, and a space to use the applying member is ensured. Both side portions of the pressing recessed portion correspond to spaces neighboring to the connector terminal, and thus the applying member is allowed to descend.

There is no insulation wall at a neighboring position of the connector terminal, and there disappear the phenomenon that resin mounts on the connector terminal due to an excessive resin of the insulation wall. Thus, connection strength is improved at ultrasonic welding and a connection portion in ultrasonic welding step is visually viewed.

Further, circuits of connector terminals are each separated by the insulation wall of the casing, and, with vibration stress to be supposed after a vehicle loads with the circuit, an insulating state between neighboring circuits is ensured.

DETAILED DESCRIPTION OF THE PREFERRED EMBODIMENTS

An embodiment of the present invention will hereafter be explained with reference to the drawings.

Figure 1:
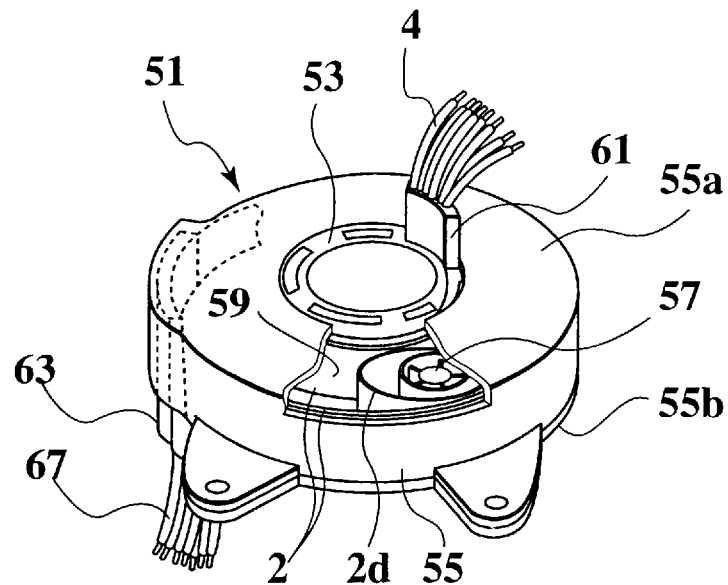
FIG. 1 is a perspective view illustrating an electrical connection device using a connector according to the present embodiment.

As illustrated in FIG. 1, an electric connection device comprises a cylindrical rotary body 53, an upper cover 55a and under cover 55b constituting a housing 55, a flexible flat cable 2, a guide roller 57, and two connecting elements 61, 63. Into the rotary body 53 there is passed through a steering wheel shaft not illustrated. The housing 55 is fixed to a steering column side and supports the rotary body 53 to be rotated. Both ends of the flat cable 2 are respectively fixed to the connecting elements and the flat cable 2 is folded back within a space 59.

An inner side portion of the flat cable 2 as viewed from an inverted portion 2d is wound around an outer circumferential surface of the rotary body 53 while, on the other hand, an outer side portion thereof is wound around an inner circumferential surface of the under cover 55b in a direction reverse from that in the case of the inner side portion.

Both ends of the flat cable 2 are connected to a control circuit (not illustrated) of the steering column side through the connecting elements 61, 63.

The two connecting elements 61, 63 are of substantially the same construction. Therefore, one connecting element 61 alone will hereafter be explained in detail.

Figure 2:
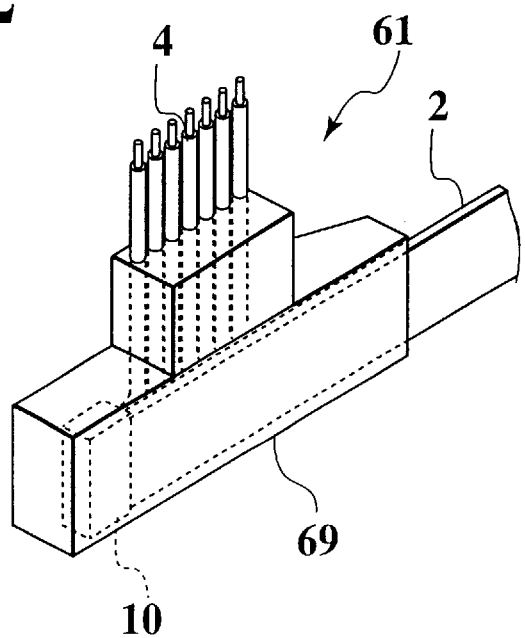
FIG. 2 is a enlarged perspective view of a connection element in FIG. 1.

As illustrated in FIG. 2, the connecting element 61 comprises a connecting connector 10 for connecting an end of the flat cable 2 and ends of electric wires 4 to each other, and a synthetic resin material 69 that covers the connector 10 from around the same in such away that this covering partially includes the flat cable 2 and electric wires 4. The connecting element 61 is formed with the use of an insert molding technique.

Figure 3:
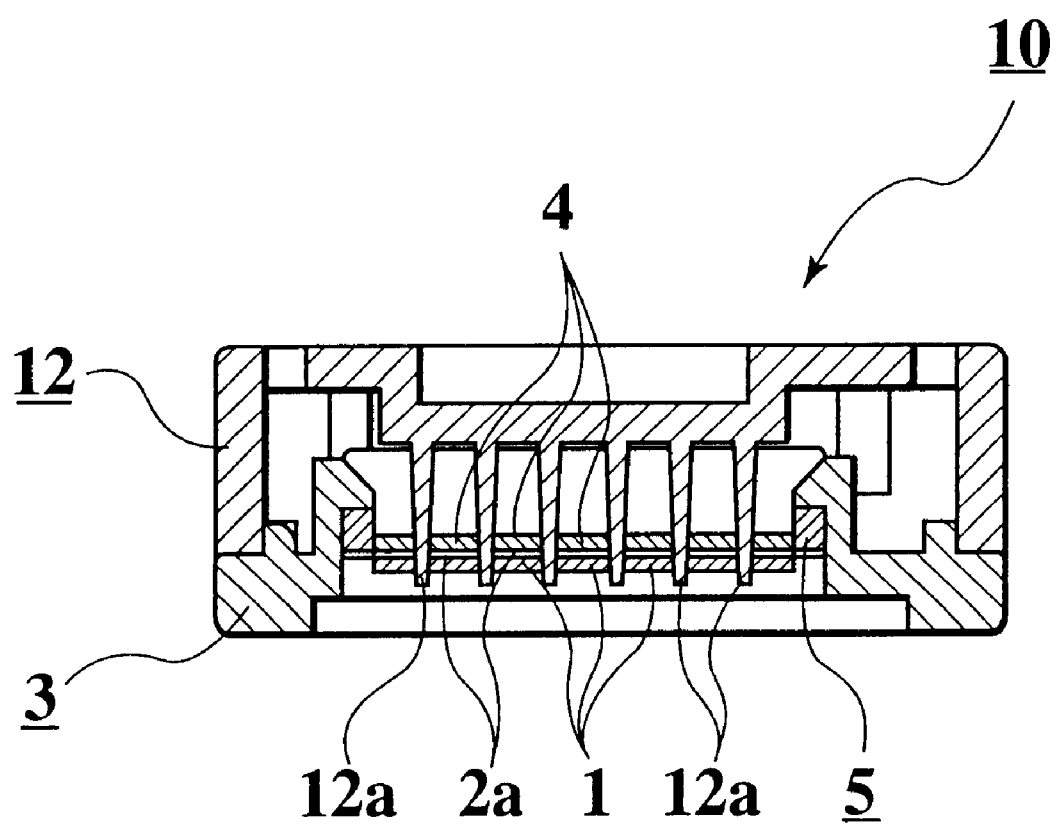
FIG. 3 is a cross-sectional view illustrating a connector which is mounted with a protective casing and is manufactured by method of the present embodiment.
Figure 4:
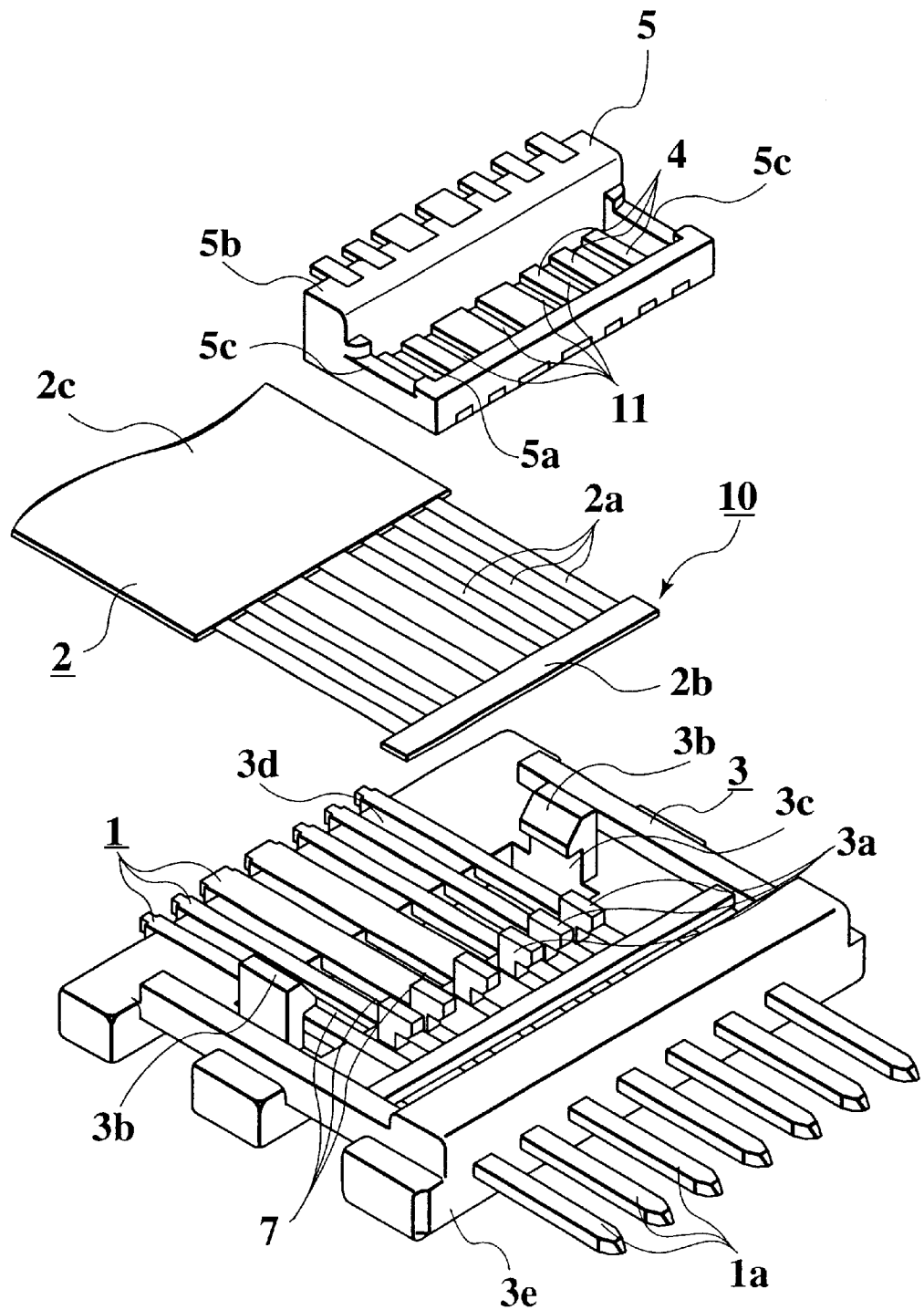
FIG. 4 is a exploded perspective view illustrating a connector without the protective casing in FIG. 1.

FIGS. 3 to 5 illustrate the connecting connector 10 for use on a flat cable.

In FIG. 3, the connector 10 is constructed in such a way that conductor portions 2a of the flat cable 2, or first and second cable conductor portions, are interposed between a plurality of connector terminals 1 and a plurality of bus bars 4 and are connected thereto by being collectively ultrasonically welded jointly with the connector terminals 1 and bus bars 4, a plurality of the connector terminals 1 being insert molded in a first holder 3 with their obverse and reverse surfaces being exposed and at the same pitches as those of the conductor portions of the flat cable 2, a plurality of the bus bars 4 being insert molded in a second holder 5 assemble (mounted) to the first holder 3 with their obverse and reverse surfaces being exposed and at the same pitches as those of the conductor portions of the flat cable 2.

At this time, as shown in FIG. 4, a plurality of the connector terminals 1 are insert molded in the first holder 3 in such a way as to have space portions 7 that are adjacent to each other in the widthwise direction of the respective connector terminals 1. The first holder 3 is schematically constructed in such a way as to have formed in substantially a central part thereof a window portion 3c having a width substantially the same as that of the flat cable 2, the window portion 3c having formed at a rear part thereof a flat cable retaining portion 3d that has a flat surface. A plurality of connector terminals 1 are insert molded in such a way as to be bridged over the window portion 3c of the first holder 3 in parallel with one another. As a result of this, the window portions 3c are partitioned by the respective connector terminals 1, whereby the space portions 7 are formed adjacently to the respective connector terminals 1. In a plurality of the connector terminals 1, frontal portions 1a protrude from a frontward side wall 3e of the first holder 3 and constitute connecting end portions that are to be inserted into a mated connector.

Also, a plurality of the bus bars 4 are insert molded in the second holder 5 in such a way as to have space portions 11 that are adjacent to one another in the widthwise directions of the respective bus bars 4. The second holder 5 is constructed schematically in such a way as to have formed on a frontal portion side thereof a window portion 5a having a width that is substantially the same as that of the flat cable 2 and to have formed a linear projection 5b on a rear portion side thereof. And, a plurality of the bus bars 4 are insert molded in such a way as to be bridged over the window portion 5a of the second holder 5 in parallel with one another. As a result of this, the window portion 5a is partitioned by the respective bus bars 4, whereby space portions 11 are formed adjacently to the respective bus bars 4. A plurality of the bus bars 4 are insert molded in such a way that the, rear portion side thereof are bent in the form of a letter "L" along the linear projection 5b of the second holder 5.

Also, in this embodiment, the respective conductor portions 2a of the flat cable 2 are pressed, applying ultrasonic vibrations thereto, by pressing recessed portions 9 through the bus bars by the use of an ultrasonic applying member 6 (see FIG. 6A), and thereby these conductor portions 2a are ultrasonically welded to the bus bars 4 and the connector terminals 1. In this case, A main body of the applying member 6 is equipped with the pressing recessed portions 9 that have been formed each having an opening width d1 greater than the width of the connector terminal 1 and a depth d2 that enables the pressing recessed portion 9 to accommodate the bus bar 4 and conductor portion 2a therein.

This ultrasonic welding is performed as follows.

FIGS. 5A, 5B, 6A and 6B illustrate the manufacturing process steps for manufacturing the connecting connector 10 for use on a flat cable.

Figure 5A:
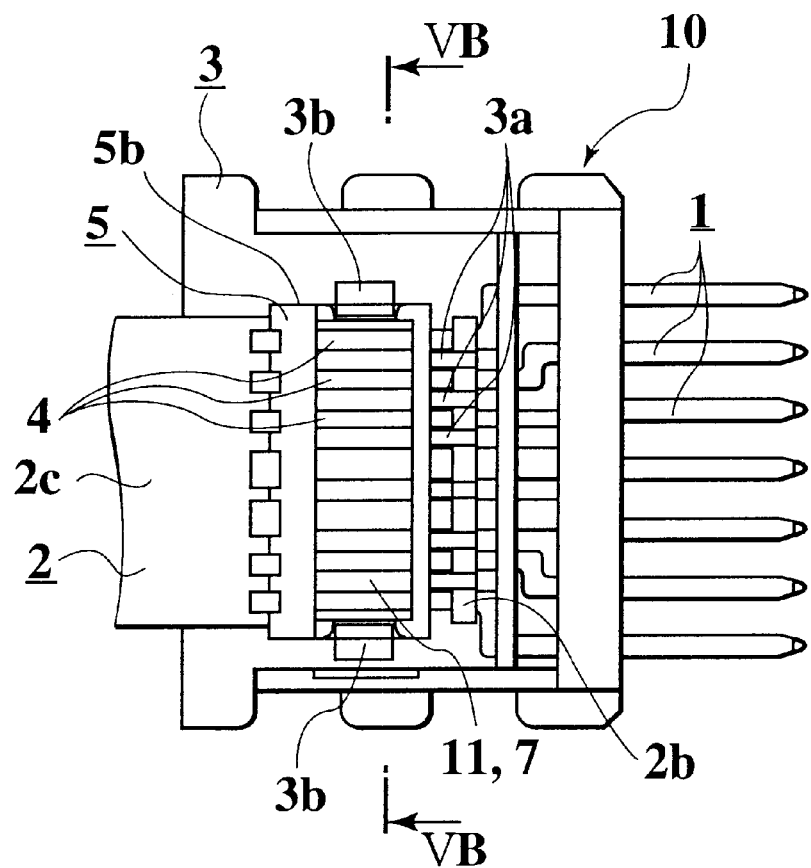
FIG. 5A is a plane view illustrating the connector of FIG. 1 in a mounting state.
Figure 5B:
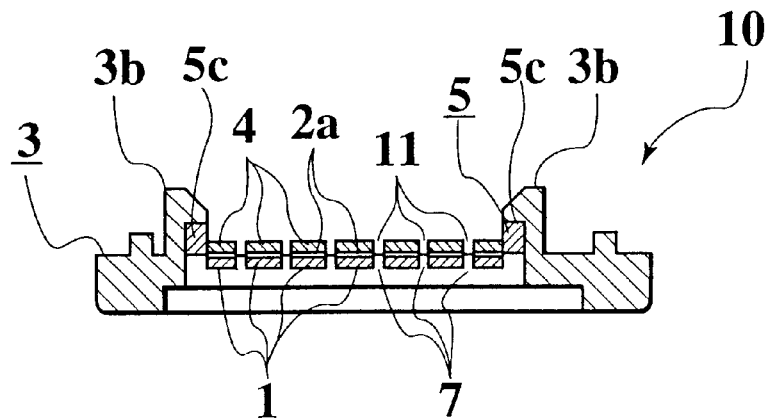
FIG. 5B is a sectional view taken along a line VB—VB of FIG. 5A.

First, as shown in FIGS. 4, 5A and 5B, the flat cable 2 is set such that an ear portion 2b which has been formed on the forward ends of the exposed conductor portions 2a in such a way as to have an insulating covering left thereon is hooked by protruding portions, 3a formed on the frontal portion side of the window 3c of the first holder 3, and such that an insulating covering portion 2c is abutted on the flat surface of the flat cable retaining portion 3d of the first holder 3. In the state of this setting, the exposed conductor portions 2a are disposed in correspondence with their respective connector terminals (see FIG. 5B).

Next, the second holder 5 is assembled to the first holder 3. This assembling is done by engaging engagement recessed portions 5c formed on both sides of the window 5a of the second holder 5 with engagement pawl portions 3b formed on both sides of the window 3c of the first holder 3, respectively (see FIG. 5B). In this assembled state, the insulating covering portion 2c of the flat cable 2 is retained between the linear projection 5b of the second holder 5 and the flat cable retaining portion 3d of the first holder 3. In addition, the respective bus bars 4 in the window 5a are disposed correspondingly to their respective exposed conductor portions 2a of the flat cable 2. In addition, the space portions 7, 11 are located at their mutually corresponding positions and communicate with one another.

Figure 6A:
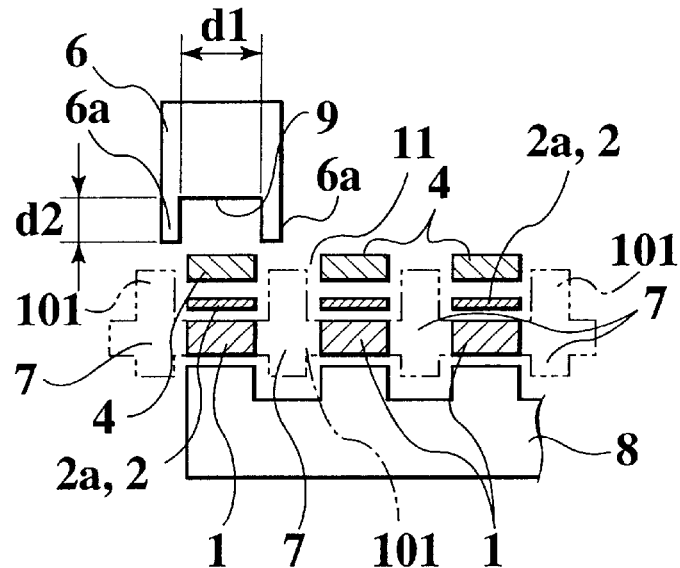
FIGS. 6A and 6B are a schematic views illustrating the step of applying ultrasonic vibrations according to the connector of FIG. 1.

After the performance of such setting, as illustrated in FIG. 6A, an anvil 8 is applied to the underside of the connector terminals 1. Then, the ultrasonic applying member 6 is pressed from above the bus bar 4 to thereby apply an ultrasonic vibration energy to it and thereby perform ultrasonic welding.

The main body of the ultrasonic applying member 6 is constructed being equipped with the pressing recessed portion 9 having an opening width d1 greater than the width of the connector terminal 1. In spite of this, since the connector terminal 1 is insert molded having the space portions 7 adjacent thereto, without insulation walls (the conventional insulation walls 101 indicated by a broken line in FIG. 6A) at the positions adjacent to the connector terminals 1. As a result, it is possible to ensure the provision of a space for use thereof. Namely, when both side portions 6a, or first and second portions, of the pressing recessed portion 9 at ultrasonic welding are inserted into the space portions 11 of the second holder 5, side portions 6a are in correspondence with the space portions 7 adjacent to the connector terminal 1. As a result of this, a free fall of the ultrasonic applying member 6 is permitted to be made.

Figure 6B:
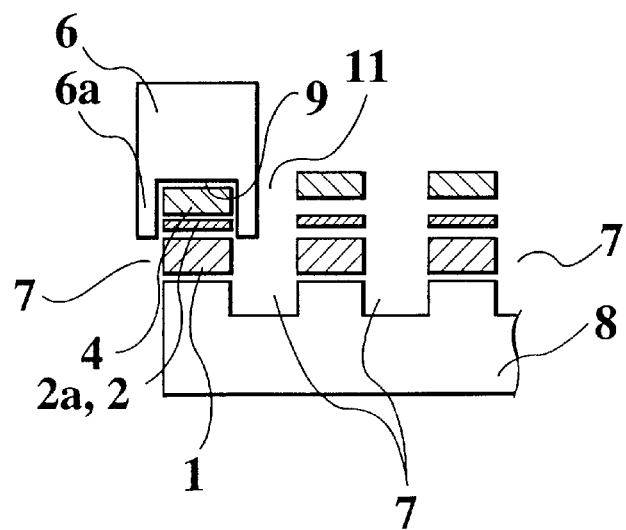

The bus bar 4 and conductor portion 2a are brought to a state of their being enclosed into the pressing recessed portion 9 by the pressing done by the ultrasonic applying member 6 (FIG. 6B). Owing to this enclosed state, the ultrasonic applying member 6 can be easily disposed at a proper welding position and it is possible to achieve a collective ultrasonic welding operation, the object of which includes the conductor portion 2a of the flat cable 2 and the bus bar 4, over within the width of the connector terminal 1.

The conductor portion 2a is ultrasonically welded in the above-described enclosed state and so a sufficient area of connection is obtained. In addition, no insulation walls exist at the positions adjacent to the connector terminal 1 and so there exist no such phenomena that resin mounts on the connector terminal 1 due to the existence of excessive resin on the insulation walls. Synthetically, it is possible to achieve a stable increase in the connection strength at the time of ultrasonic welding.

Also, since in this embodiment no insulation walls have existed at the positions adjacent to the connector terminal 1, it is possible to easily perform visual confirmation of the connected portions in the process steps of ultrasonic welding. Through this visual confirmation, even when a product with unqualified connections has occurred, it is possible to reliably abate such unqualified connection product and thereby prevent the occurrence of a defective product.

As illustrated in FIG. 3, after ultrasonic welding, a line circuit prepared for each connector terminal 1 at the welding position is isolated or separated by insertion into between the line circuits of the insulation walls 12a of a protective casing 12 assembled to the first holder 3. Namely, the insulation walls 12a of the protective casing 12 are passed through and inserted into the space portions 7, 11. This protective casing 12 is integrally formed as one unit that is equipped with the insulation walls 12a by the use of a synthetic resin material with an electrically insulating property.

In the connecting connector 10 that has been obtained in this way, the line circuit in units of a connector terminal 1 is isolated from another by the insulation walls 12a of the protective casing 12. Therefore, despite the vibration stress that will possibly occur after the loading of the connector onto a vehicle, it is possible to ensure a state of insulation between the adjacent line circuits, thereby enhancing the reliability thereof in a form combined with the enhancement of the connection strength at the time of the above-described ultrasonic welding.

Further, in this connecting connector 10, even when the pitch dimension of the conductor portions 2a of the flat cable 2 is made small due to an increase in the number of the signal line circuits, it is possible to ensure the state of insulation between the adjacent line circuits succeeding the ultrasonic welding that is obtained the insulation walls 12a, as well as the enhancement in the connection strength that is made by proper positioning of the ultrasonic applying member 6.

What is claimed is:

1. A manufacturing method of a connector for a cable comprising the steps of:

placing a first conductor portion of the cable on a first connector terminal;

accommodating the first conductor portion in a recess formed to an applying member by positioning the first conductor portion between a pair of opposed side portions of the recess;

pressing the first conductor portion and the first connector terminal together; and welding the first conductor portion and the first connector terminal by applying ultrasonic vibrations to the first conductor portion and the first connector terminal through the applying member.

2. The manufacturing method of a connector as set forth in claim 1, further comprising the steps of:

providing a second connector terminal spaced from the first connector terminal;

placing a second conductor portion of the cable on the second connector terminal;

accommodating the second conductor portion in the recess;

pressing the second conductor portion and the second connector terminal together;

welding the second conductor portion and the second connector terminal by applying ultrasonic vibrations to the second conductor portion and the second connector terminals through the applying member; and inserting an insulation wall between the first conductor portion welded to the first connector terminal and the second conductor portion welded to the second connector terminal.

3. A manufacturing method of a connector for a cable comprising the steps of:

providing connector terminals spaced from each other;

placing a respective one of conductor portions of the cable on a corresponding one of connector terminals;

accommodating the respective connector portions in a recess of an applying member by positioning the respective conductor portions between a pair of opposed side portions of the recess;

pressing the respective conductor portions and the corresponding connector terminals together; and welding the respective conductor portions and the corresponding connector terminals by applying ultrasonic vibrations to the respective conductor portions and the corresponding connector terminals through the applying member.

4. The manufacturing method of a connector according to claim further comprising the step of:

inserting respective insulation walls between the respective conductor portions welded to the corresponding connector terminals and neighboring one of the respective conductor portions.

5. A manufacturing method of a connector comprising the steps of:

providing a cable having a conductor portion;

providing a holder having a connector terminal;

providing an applying member having a pair of side portions and a recess formed between the pair of side portions;

placing the conductor portion of the cable on the connector terminal of the holder;

accommodating the conductor portion of the cable in the recess of the applying member by positioning the conductor portion of the cable between the pair of side portions of the applying member;

pressing the conductor portion of the cable and the connector terminal of the holder together; and welding the conductor portion of the cable and the connector terminal of the holder by applying ultrasonic vibrations to the conductor portion of the cable and the connector terminal of the holder through the applying member.

6. The manufacturing method of claim 5, further comprising the steps of:

providing another holder having a bus bar;

placing the bus bar of the another holder on the conductor portion of the cable and thereby positioning the conductor portion of the cable between the bus bar of the another holder and the connector terminal of the holder;

accommodating the bus bar of the another holder in the recess of the applying member by positioning the bus bar of the another holder between the pair of side portions of the applying member;

pressing the bus bar of the another holder and the conductor portion of the cable together; and welding the bus bar of the another holder and the conductor portion of the cable by applying ultrasonic vibrations to the bus bar of the another holder and the conductor portion of the cable through the applying member.

7. The manufacturing method of claim 6, wherein the another holder, the cable, and the holder respectively have a plurality of corresponding bus bars, conductor portions, and connector terminals.

8. The manufacturing method of claim 7, further comprising the steps of:

providing a protective casing having a plurality of insulation walls; and inserting the insulations walls of the protective casing between the bus bars of the another holder, between the conductor portions of the cable, and between the connector terminals of the holder.

* * * * *